(12) United States Patent
     Li

(10) Patent No.: US 10,438,091 B2
(45) Date of Patent: Oct. 8, 2019

(54) METHOD AND APPARATUS FOR RECOGNIZING IMAGE CONTENT

(71) Applicant: Tencent Technology (Shenzhen) Company Limited, Shenzhen (CN)

(72) Inventor: Xianglin Li, Shenzhen (CN)

(73) Assignee: TENCENT TECHNOLOGY (SHENZHEN) COMPANY LIMITED, Shenzhen, Guangdong Province (CN)

(*) Notice: Subject to any disclaimer, the term of this patent is extended or adjusted under 35 U.S.C. 154(b) by 151 days.

(21) Appl. No.: 15/701,136

(22) Filed: Sep. 11, 2017

(65) Prior Publication Data
    US 2017/0372169 A1   Dec. 28, 2017

Related U.S. Application Data

(63) Continuation-in-part of application No. PCT/CN2016/078568, filed on Apr. 6, 2016.

(30) Foreign Application Priority Data

Nov. 6, 2015  (CN) .......................... 2015 1 0753125

(51) Int. Cl.
    *G06K 9/00*    (2006.01)
    *G06K 9/62*    (2006.01)
    *G06F 16/583*  (2019.01)

(52) U.S. Cl.
    CPC ....... *G06K 9/6202* (2013.01); *G06F 16/5838* (2019.01); *G06K 9/00* (2013.01);
    (Continued)

(58) Field of Classification Search
    CPC .... G06K 9/6202; G06K 9/628; G06K 9/6215; G06K 9/6269; G06F 16/5838
    (Continued)

(56) References Cited

U.S. PATENT DOCUMENTS 8,909,563 B1* 12/2014 Jing .................. G06K 9/00664
                                              706/12
8,942,487 B1*  1/2015 Baluja ............... G06K 9/00684
                                              382/224
(Continued)

FOREIGN PATENT DOCUMENTS

CN    101661559 A    3/2010
CN    103207879 A    7/2013
(Continued)

OTHER PUBLICATIONS

Tencent Technology, ISRWO, PCT/CN2016/078568, dated Jul. 28, 2016, 9 pgs.
(Continued)

*Primary Examiner* — Van D Huynh
(74) *Attorney, Agent, or Firm* — Morgan, Lewis & Bockius LLP

(57) ABSTRACT

The present disclosure provides a method performed at a computing device for recognizing an image's content. The method includes: extracting one or more features from an image to be recognized; comparing the features of the image with a set of image classifiers and obtaining a probability value for each image classifier; selecting, from the set of image classifiers, at least one image classifier as a target image classifier according to the probability value of the image classifier; determining a degree of similarity between each image and the image to be recognized, and selecting, from the target image classifier, multiple images as target images when their respective degrees of similarity with the image to be recognized exceed a predefined threshold; and labeling, the image to be recognized according to a class label corresponding to the target image classifier and entity labels corresponding to the target images in the target image classifier.

19 Claims, 3 Drawing Sheets

(52) U.S. Cl.
CPC ........... *G06K 9/628* (2013.01); *G06K 9/6215* (2013.01); *G06K 9/6269* (2013.01)

(58) Field of Classification Search
USPC ........................................................ 382/157
See application file for complete search history.

(56) References Cited

U.S. PATENT DOCUMENTS

| | | | |
|---|---|---|---|
| 2009/0208118 A1* | 8/2009 | Csurka ............... | G06K 9/00664 382/228 |
| 2014/0105475 A1* | 4/2014 | Sato ........................ | G06K 9/52 382/128 |
| 2015/0109474 A1* | 4/2015 | Saruta ............... | G06K 9/00664 348/222.1 |
| 2015/0142708 A1* | 5/2015 | Jing ................... | G06K 9/00664 706/12 |
| 2015/0169645 A1* | 6/2015 | Li ........................ | G06F 16/532 707/722 |
| 2015/0310301 A1 | 10/2015 | Zadeh | |
| 2016/0125273 A1* | 5/2016 | Matsunaga .......... | G06K 9/6269 382/159 |
| 2016/0203525 A1* | 7/2016 | Hara ................... | G06Q 30/0271 705/14.56 |
| 2016/0379091 A1* | 12/2016 | Lin ..................... | G06K 9/00724 382/156 |
| 2017/0344822 A1* | 11/2017 | Popescu ................... | G06K 9/62 |
| 2018/0210896 A1* | 7/2018 | Guo ........................ | G06F 16/00 |

FOREIGN PATENT DOCUMENTS

| | | |
|---|---|---|
| CN | 104766343 A | 7/2015 |
| CN | 105354307 A | 2/2016 |

OTHER PUBLICATIONS

Tencent Technology, IPRP, PCT/CN2016/078568, dated May 8, 2018, 8 pgs.

* cited by examiner

METHOD AND APPARATUS FOR RECOGNIZING IMAGE CONTENT

RELATED APPLICATION

This application is a continuation-in-part application of PCT/CN2016/078568, entitled "METHOD AND DEVICE FOR RECOGNIZING IMAGE CONTENTS" filed on Apr. 6, 2016, which claims priority to Chinese Patent Application No. 201510753125.6, filed with the State Intellectual Property Office of the People's Republic of China on Nov. 6, 2015, and entitled "METHOD AND APPARATUS FOR RECOGNIZING IMAGE CONTENT", both of which are incorporated herein by reference in their entirety.

FIELD OF THE TECHNOLOGY

The present disclosure relates to the field of image processing technologies, and in particular, to a method and an apparatus for recognizing an image's content.

BACKGROUND

With the development of Internet technologies and social media, users need to process an increasingly large quantity of pictures. A large number of pictures are uploaded by users on the Internet and social networking software. Most of these pictures are not labeled with content information, for example, information about whether a picture is about a geographic location, a famous scenic spot or a building. As a result, users cannot know the content of these pictures or places where these pictures are taken. Therefore, a method for recognizing these pictures is needed.

In a solution in the existing technology, during picture recognition, first, a feature of a picture to be recognized is extracted, then an image database is searched for several pieces of feature data that are most similar to the feature of the picture to be recognized, and eventually a content label for the picture to be recognized is determined according to related web page text of the similar data. However, this method has the following disadvantages: First, this method depends on web page text data related to a picture to be recognized, but a content label extracted from the text data includes a lot of noise. Second, an image database to be searched is very large and includes a lot of noise, pictures that have similar content but different semantics are likely to be found, and consequently, inaccurate labels are provided eventually. Third, recognized picture content belongs to a wide range and is not precise enough.

SUMMARY

Embodiments of the present disclosure provide a method and an apparatus for recognizing an image's content, where precision of image recognition is improved by performing two times of similarity matching and calculation to label an image to be recognized.

A first aspect of the present disclosure provides a method for recognizing an image's content, including:

extracting a convolutional neural network (CNN) feature of an image to be recognized;

inputting the image to be recognized to a predefined set of image classifiers, and obtaining, according to the CNN features of the image to be recognized, a probability value for each image classifier in the set of image classifiers, each image classifier including a class cluster, the class cluster corresponding to a class label, each class cluster including multiple images, and each image of the multiple images corresponding to an entity label;

selecting, from the set of image classifiers, at least one image classifier as a target image classifier according to the probability value of the image classifier;

determining a degree of similarity between each image in the target image classifier and the image to be recognized, and selecting, from the target image classifier, multiple images as target images when their respective degrees of similarity with the image to be recognized exceed a predefined threshold; and labeling, the image to be recognized according to a class label corresponding to the target image classifier and entity labels corresponding to the target images in the target image classifier.

In a first possible implementation manner of the first aspect, each image classifier corresponds to a coefficient vector, and the obtaining, according to the CNN features of the image to be recognized, a probability value for each image classifier in the set of image classifiers includes:

converting the CNN features of the image to be recognized into a feature vector of the image to be recognized;

calculating a vector inner product of each image classifier and the image to be recognized according to the coefficient vector of each image classifier and the feature vector of the image to be recognized;

calculating the probability value for the image classifier according to the vector inner product of the image classifier and the image to be recognized.

With reference to the first possible implementation manner of the first aspect, in a second possible implementation manner of the first aspect, the calculating the probability value for the image classifier according to the vector inner product of the image classifier and the image to be recognized includes:

mapping the vector inner product of each image classifier and the image to be recognized to a positive real number field to obtain exponential values, and calculating a sum of the exponential values; and dividing the exponential values of the target image classifier and the image to be recognized by the sum of the exponential values, to calculate a probability value for the target image classifier.

With reference to the first possible implementation manner of the first aspect, in a third possible implementation manner of the first aspect, the determining a degree of similarity between each image in the target image classifier and the image to be recognized includes:

obtaining one or more CNN features of each image in the target image classifier;

converting the CNN features of each image in the target image classifier into a feature vector of each image; and multiplying the feature vector of each image in the target image classifier by the feature vector of the image to be recognized to obtain the degree of similarity.

In a fourth possible implementation manner of the first aspect, before the extracting one or more CNN features of an image to be recognized, the method further includes:

extracting one or more CNN features of each image of multiple images, and recognizing text information corresponding to each image to obtain an entity label of each image;

classifying, according to the CNN features of each image, the multiple images into multiple class clusters; and determining a class label for each class cluster according to entity labels of images in the class cluster of the multiple class clusters;

With reference to the fourth possible implementation manner of the first aspect, in a fifth possible implementation manner of the first aspect, the determining a class label for each class cluster according to entity labels of images in the class cluster of the multiple class clusters includes:

counting a quantity of same entity labels of the images in each class cluster; and selecting a target entity label as the class label of each class cluster according to the quantity of same entity labels of the images in each class cluster.

Correspondingly, a second aspect of the present disclosure provides an apparatus for recognizing an image's content, including:

a first extraction module, configured to extract one or more CNN features of an image to be recognized;

a probability calculation module, configured to: input the image to be recognized to a predefined set of image classifiers, and obtain, according to the CNN features of the image to be recognized, a probability value for each image classifier in the set of image classifiers, each image classifier including a class cluster, the class cluster corresponding to a class label, each class cluster including multiple images, and each image of the multiple images corresponding to an entity label;

a classifier selection module, configured to select, from the set of image classifiers, at least one image classifier as a target image classifier according to the probability value of the image classifier;

an image selection module, configured to determine a degree of similarity between each image in the target image classifier and the image to be recognized, and select, from the target image classifier, multiple images as target images when their respective degrees of similarity with the image to be recognized exceed a predefined threshold; and an image labeling module, configured to label, the image to be recognized according to a class label corresponding to the target image classifier and entity labels corresponding to the target images in the target image classifier.

In a first possible implementation manner of the second aspect, each image classifier corresponds to a coefficient vector, and the probability calculation module includes: a feature conversion unit, configured to convert the CNN features of the image to be recognized into a feature vector of the image to be recognized;

a feature calculation unit, configured to calculate a vector inner product of each image classifier and the image to be recognized according to the coefficient vector of each image classifier and the feature vector of the image to be recognized; and a probability calculation unit, configured to calculate, according to the vector inner product of each image classifier and the image to be recognized, the probability value for each image classifier.

With reference to the first possible implementation manner of the second aspect, in a second possible implementation manner of the second aspect, the probability calculation unit is specifically configured to:

map the vector inner product of each image classifier and the image to be recognized to a positive real number field to obtain exponential values, and calculate a sum of the exponential values; and divide the exponential values of the target image classifier and the image to be recognized by the sum of the exponential values, to calculate a probability value for the target image classifier.

With reference to the first possible implementation manner of the second aspect, in a third possible implementation manner of the second aspect, the image selection module is specifically configured to:

obtain one or more CNN features of each image in the target image classifier;

convert the CNN features of each image in the target image classifier into a feature vector of each image; and multiply the feature vector of each image in the target image classifier by the feature vector of the image to be recognized to obtain the degree of similarity.

In a fourth possible implementation manner of the second aspect, the apparatus further includes:

a second extraction module, configured to: extract one or more CNN features of each image of multiple images, and recognize text information corresponding to each image to obtain an entity label of each image;

an image classification module, configured to classify, according to the CNN features of each image, the multiple images into multiple class clusters; and a label determining module, configured to determine a class label for each class cluster according to entity labels of images in the class cluster of the multiple class clusters.

With reference to the fourth possible implementation manner of the second aspect, in a fifth possible implementation manner of the second aspect, the label determining module is specifically configured to:

count a quantity of same entity labels of the images in each class cluster; and select a target entity label as the class label of each class cluster according to the quantity of same entity labels of the images in each class cluster.

To implement embodiments of the present disclosure, first, one or more CNN features of an image to be recognized is extracted; next, the image to be recognized is input to a predefined set of image classifiers, a probability value for each image classifier in the set of image classifiers is obtained according to the CNN features of the image to be recognized, and at least one image classifier is selected, from the set of image classifiers according to the probability value for each image classifier, as a target image classifier; then, a degree of similarity between each image in the target image classifier and the image to be recognized is determined, and multiple images are selected, from the target image classifier according to the degree of similarity, as target images; and eventually, the image to be recognized is labeled by using a class label corresponding to a class cluster in the target image classifier and entity labels corresponding to the target images in the target image classifier. Precision of image recognition is improved by performing two times of similarity matching and calculation to label an image to be recognized.

BRIEF DESCRIPTION OF DRAWINGS

To illustrate the technical solutions according to the embodiments of the present disclosure more clearly, the accompanying drawings for describing the embodiments are introduced briefly in the following. Apparently, the accompanying drawings in the following description are some embodiments of the present disclosure, and a person of ordinary skill in the art can derive other drawings from the accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

Figure 1:
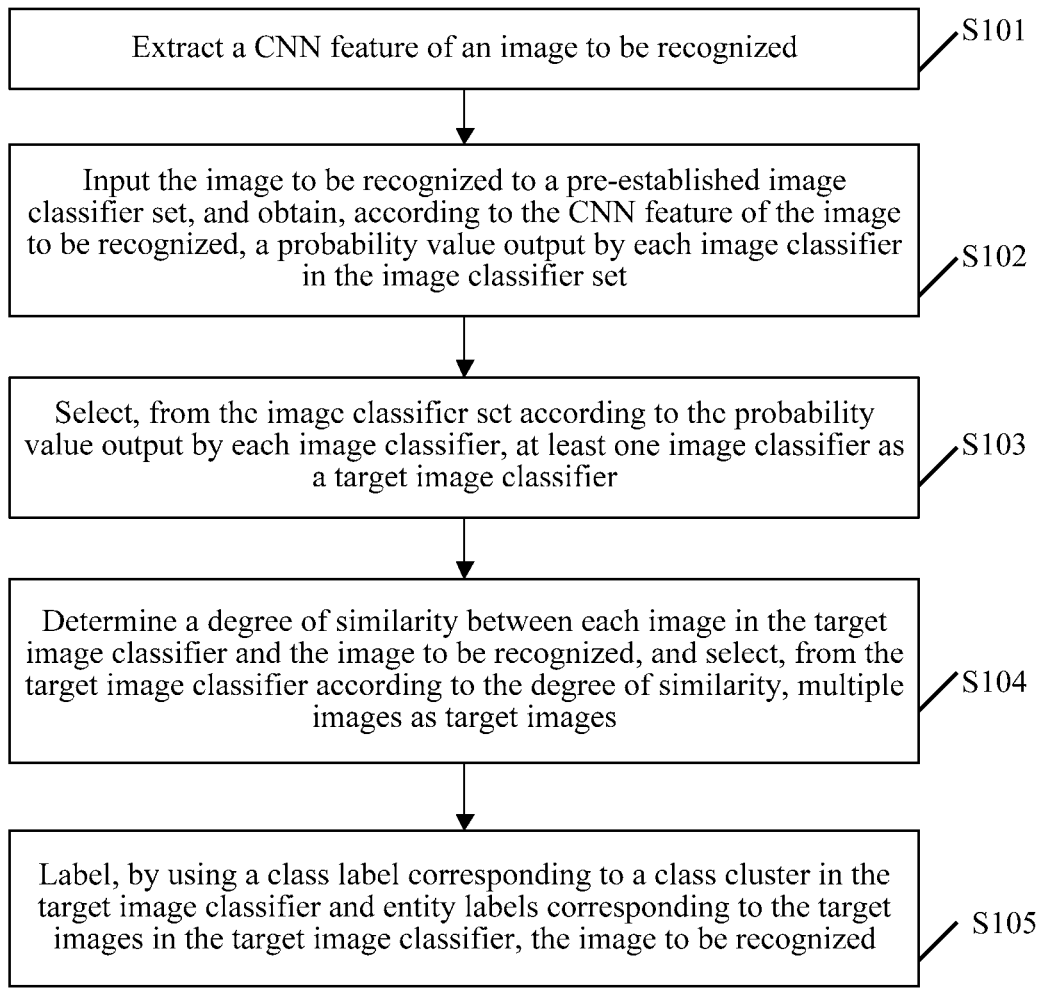
FIG. 1 is a flowchart of a first embodiment of a method for recognizing an image's content according to the present disclosure.

Referring to FIG. 1, FIG. 1 is a flowchart of a first embodiment of a method for recognizing an image's content according to the present disclosure. As shown in FIG. 1, the method in this embodiment of the present disclosure includes S101 to S105:

S101: Extract one or more CNN features of an image to be recognized.

In specific implementation, a CNN is a neural network parallel processor based on local connectivity of neurons. A basic structure of the CNN includes a feature extraction layer and a feature map layer. In the feature extraction layer, the input of each neuron is connected to local receptive fields of a previous layer. A local feature is extracted. Once the local feature is extracted, a positional relationship between the local feature and another feature is determined. In the feature map layer, each computing layer of the network is composed of multiple feature map. Every feature map is a plane in which weights of all neurons are equal. An activation function which has little impact on a function kernel is used for a structure of the feature map, which makes the feature map have shift invariance. Besides, since the neurons in the mapping plane share weight, the number of free parameters of the network is reduced. Each convolution layer in the CNN is followed by a computing layer which is used to calculate a local average and a second extract. This unique two-feature extraction structure reduces feature resolution.

S102: Input the image to be recognized to a predefined set of image classifiers, and obtain, according to the CNN features of the image to be recognized, a probability value for each image classifier in the set of image classifiers, where each image classifier includes a class cluster, the class cluster corresponds to a class label, each class cluster includes multiple images, and each image of the multiple images corresponds to an entity label.

In specific implementation, each image classifier corresponds to a feature vector, a class cluster corresponds to one or more class labels, and an image may correspond to one or more entity labels. The CNN feature of the image to be recognized may be converted into a feature vector of the image to be recognized. A vector inner product of each image classifier and the image to be recognized is calculated according to a coefficient vector of each image classifier and the feature vector of the image to be recognized. The probability value for each image classifier is calculated according to the vector inner product of each image classifier and the image to be recognized. Further, the vector inner product of each image classifier and the image to be recognized is mapped to a positive real number field to obtain exponential values, and a sum of the exponential values is calculated. The exponential values of the target image classifier and the image to be recognized are divided by the sum of the exponential values to calculate a probability value for the target image classifier. It should be noted that after the image to be recognized is input to the set of image classifiers: if an image classifier has a largest probability value, it indicates that the image to be recognized has a highest degree of similarity with and image in the image classifier; and if an image classifier has a smallest probability value, it indicates that the image to be recognized has a lowest degree of similarity with an image in the image classifier is the lowest.

For example, assuming that the set of image classifiers includes N image classifiers, each image classifier model is a vector $w_k$, a probability value that a vector x of the image to be recognized belongs to a $k^{th}$ image classifier model is input, and a calculation formula is as follows:

$$P(k) = \frac{\exp(w_k^T x)}{\sum_{i=1}^{N} \exp(w_i^T x)}.$$

S103: Select, from the set of image classifiers, at least one image classifier as a target image classifier according to the probability value of the image classifier.

In specific implementation, probability values output by image classifiers are compared, the probability values are arranged in descending order, at least one probability value that ranks at the top is selected, and an image classifier corresponding to the at least one probability value is set as a target image classifier.

S104: Determine a degree of similarity between each image in the target image classifier and the image to be recognized, and select, from the target image classifier, multiple images as target images when their respective degrees of similarity with the image to be recognized exceed a predefined threshold.

In specific implementation, first, the CNN features of the image to be recognized is converted into the feature vector of the image to be recognized, one or more CNN features of each image in the target image classifier is obtained, the CNN features of each image in the target image classifier is converted into a feature vector of each image, and the feature vector of each image in the target image classifier is multiplied by the feature vector of the image to be recognized to obtain a vector inner product. When the vector inner product is larger, the degree of similarity is higher. Eventually, degrees of similarity between the image to be recognized and images in the target image classifier are compared and sorted in descending order, multiple degrees of similarity that rank at the top are selected, and images corresponding to the multiple degrees of similarity are used as target images.

S105: Label, the image to be recognized according to a class label corresponding to the target image classifier and entity labels corresponding to the target images in the target image classifier.

For example, the set of image classifiers includes a class cluster 1, a class cluster 2, and a class cluster 3. The class cluster 1, the class cluster 2, and the class cluster 3 correspond to a class label 1, a class label 2, and a class label 3, respectively. The class cluster 1 includes an image 1, an image 2, and an image 3. The class cluster 2 includes an image 4 and an image 5. The class cluster 3 includes an image 6, an image 7, and an image 8. The images 1 to 8 correspond to an entity label 1 to an entity label 8, respectively. The class cluster 2 and the class cluster 3 are selected according to a probability value output by an image classifier. It is determined that the image to be recognized has a highest degree of similarity with the image 5 in the class cluster 2 and the image 7 in the class cluster 3. Therefore, the class label 2 and the class label 3 may be fused, and the entity label 5 of the image 5 and the entity label 7 of the image 7 may be fused, so as to label the image to be recognized.

In this embodiment of the present disclosure, first, one or more CNN features of an image to be recognized is extracted; next, the image to be recognized is input to a predefined set of image classifiers, a probability value for each image classifier in the set of image classifiers is obtained according to the CNN features of the image to be recognized, and at least one image classifier is selected, from the set of image classifiers according to the probability value for each image classifier, as a target image classifier; then, a degree of similarity between each image in the target image classifier and the image to be recognized is determined, and multiple images are selected, from the target image classifier according to the degree of similarity, as target images; and eventually, the image to be recognized is labeled by using a class label corresponding to a class cluster in the target image classifier and entity labels corresponding to the target images in the target image classifier. Precision of image recognition is improved by performing two times of similarity matching and calculation to label an image to be recognized.

Figure 2:
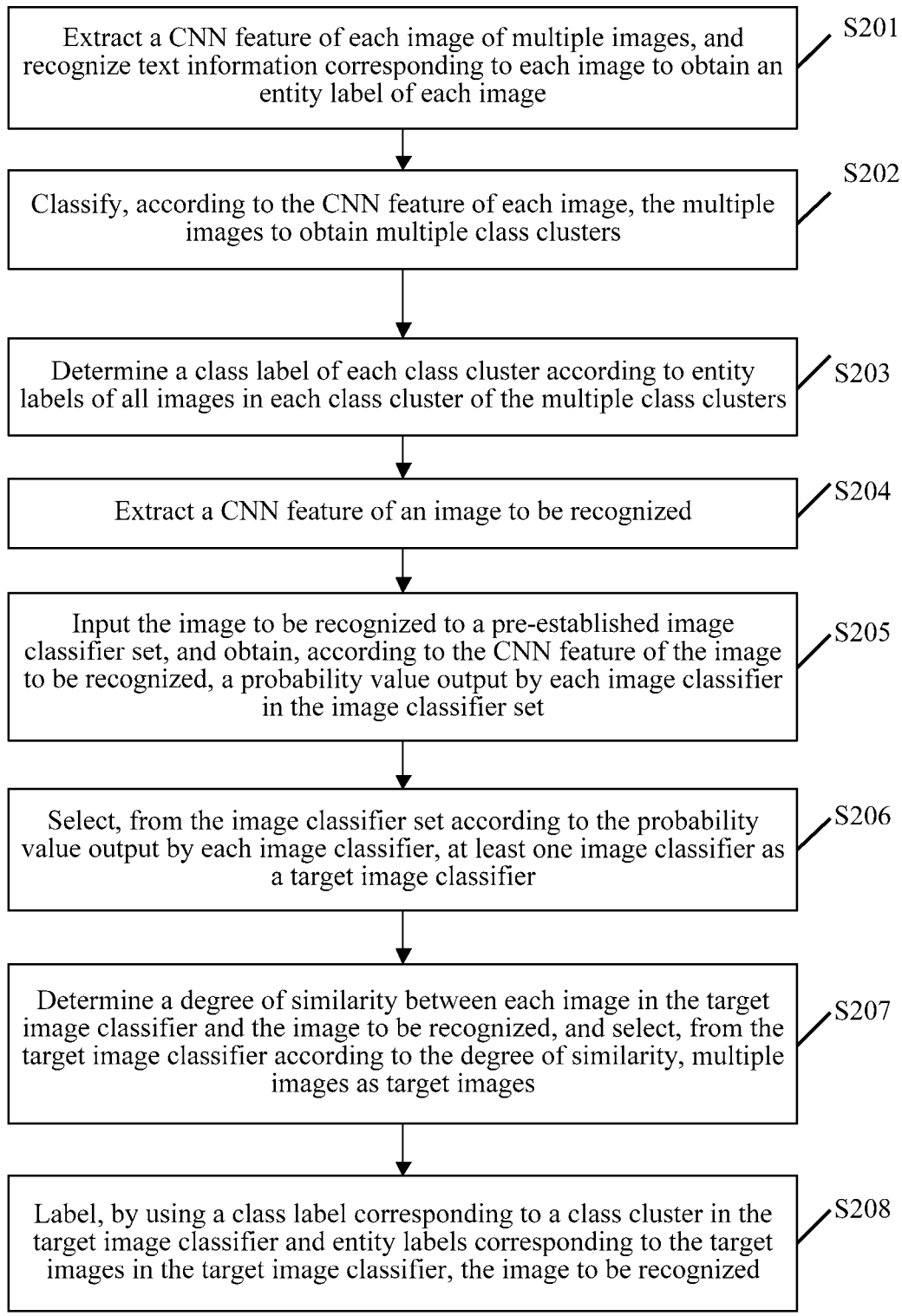
FIG. 2 is a flowchart of a second embodiment of a method for recognizing an image's content according to the present disclosure.

Referring to FIG. 2, FIG. 2 is a flowchart of a second embodiment of a method for recognizing an image's content according to the present disclosure. As shown in FIG. 2, the method in this embodiment of the present disclosure includes S201 to S208:

S201: Extract one or more CNN features of each image of multiple images, and recognize text information corresponding to each image to obtain an entity label of each image.

In specific implementation, multiple search terms with high search frequency may be first selected to form a download dictionary. A cluster of web crawlers captures a related image and text information corresponding to the image on the Internet by using each search term in the download dictionary, and saves these images and the text information corresponding to the images in a distributed file system. The CNN feature of each image of the multiple images is extracted by using parallel CNN computing, and the text information corresponding to each image is recognized by using a Neuro-Linguistic Programming (NLP) word, so as to obtain the entity label of each image.

S202: Classify, according to the CNN features of each image, the multiple images into multiple class clusters.

In specific implementation, K-means clustering may be performed on CNN features of images that are captured by using a same search term, so as to classify the multiple images to obtain the multiple class clusters. K-means clustering is a process of classifying and organizing similar data members in a data set. In the clustering method, K objects are first randomly selected and used as an initial cluster center. Then a distance between each object and each seed cluster center is calculated. Each object is assigned to a cluster center nearest to the object. The cluster centers and the objects assigned to the cluster centers represent a cluster.

S203: Determine a class label for each class cluster according to entity labels of images in the class cluster of the multiple class clusters.

In specific implementation, a quantity of same entity labels of the images in each class cluster is first counted. Then a target entity label is selected as the class label of each class cluster according to the quantity of same entity labels of the images in each class cluster. Eventually, each class cluster is numbered, and a parallel machine learning platform is used to train a logistic regression classifier (LR, a classification algorithm) classification model to obtain a set of image classifiers. In addition, same entity labels in each class cluster may be sorted, and an entity label whose quantity ranks top n is set as the class label of the class cluster.

S204: Extract one or more CNN features of an image to be recognized.

In specific implementation, a CNN is a neural network parallel processor based on local connectivity of neurons. A basic structure of the CNN includes a feature extraction layer and a feature map layer. In the feature extraction layer, the input of each neuron is connected to local receptive fields of a previous layer. A local feature is extracted. Once the local feature is extracted, a positional relationship between the local feature and another feature is determined. In the feature map layer, each computing layer of the network is composed of multiple feature map. Every feature map is a plane in which weights of all neurons are equal. An activation function which has little impact on a function kernel is used for a structure of the feature map, which makes the feature map have shift invariance. Besides, since the neurons in the mapping plane share weight, the number of free parameters of the network is reduced. Each convolution layer in the CNN is followed by a computing layer which is used to calculate a local average and a second extract. This unique two-feature extraction structure reduces feature resolution.

S205: Input the image to be recognized to a predefined set of image classifiers, and obtain, according to the CNN features of the image to be recognized, a probability value for each image classifier in the set of image classifiers, where each image classifier includes a class cluster, the class cluster corresponds to a class label, each class cluster includes multiple images, and each image of the multiple images corresponds to an entity label.

In specific implementation, each image classifier corresponds to a feature vector, one class cluster corresponds to one or more class labels, and an image may correspond to one or more entity labels. The CNN feature of the image to be recognized is converted into a feature vector of the image to be recognized; a vector inner product of each image classifier and the image to be recognized is calculated according to a coefficient vector of each image classifier and the feature vector of the image to be recognized; and the probability value for each image classifier is calculated according to the vector inner product of each image classifier and the image to be recognized. Further, the vector inner product of each image classifier and the image to be recognized is mapped to a positive real number field to obtain exponential values, and a sum of the exponential values is calculated; and the exponential values of the target image classifier and the image to be recognized are divided by the sum of the exponential values to calculate a probability value for the target image classifier. It should be noted that after the image to be recognized is input to the set of image classifiers: if an image classifier has a largest probability value, it indicates that the image to be recognized has a highest degree of similarity with and image in the image classifier; and if an image classifier has a smallest probability value, it indicates that the image to be recognized has a lowest degree of similarity with an image in the image classifier is the lowest.

For example, assuming that the set of image classifiers includes N image classifiers, each image classifier model is a vector $w_k$, a probability value that a vector x of the image to be recognized belongs to a $k^{th}$ image classifier model is input, and a calculation formula is as follows:

$$P(k) = \frac{\exp(w_k^T x)}{\sum_{i=1}^{N} \exp(w_i^T x)}.$$

S206: Select, from the set of image classifiers, at least one image classifier as a target image classifier according to the probability value of the image classifier.

In specific implementation, probability values output by image classifiers are compared, the probability values are arranged in descending order, at least one probability value that ranks at the top is selected, and an image classifier corresponding to the at least one probability value is set as a target image classifier.

S207: Determine a degree of similarity between each image in the target image classifier and the image to be recognized, and select, from the target image classifier, multiple images as target images when their respective degrees of similarity with the image to be recognized exceed a predefined threshold.

In specific implementation, first, the CNN features of the image to be recognized is converted into the feature vector of the image to be recognized, one or more CNN features of each image in the target image classifier is obtained, the CNN features of each image in the target image classifier is converted into a feature vector of each image, and the feature vector of each image in the target image classifier is multiplied by the feature vector of the image to be recognized to obtain a vector inner product. When the vector inner product is larger, the degree of similarity is higher. Eventually, degrees of similarity between the image to be recognized and images in the target image classifier are compared and sorted in descending order, multiple degrees of similarity that rank at the top are selected, and images corresponding to the multiple degrees of similarity are used as target images.

S208: Label, the image to be recognized according to a class label corresponding to the target image classifier and entity labels corresponding to the target images in the target image classifier.

For example, the set of image classifiers includes a class cluster 1, a class cluster 2, and a class cluster 3. The class cluster 1, the class cluster 2, and the class cluster 3 correspond to a class label 1, a class label 2, and a class label 3, respectively. The class cluster 1 includes an image 1, an image 2, and an image 3. The class cluster 2 includes an image 4 and an image 5. The class cluster 3 includes an image 6, an image 7, and an image 8. The images 1 to 8 correspond to an entity label 1 to an entity label 8, respectively. The class cluster 2 and the class cluster 3 are selected according to a probability value output by an image classifier. It is determined that the image to be recognized has a highest degree of similarity with the image 5 in the class cluster 2 and the image 7 in the class cluster 3. Therefore, the class label 2 and the class label 3 may be fused, and the entity label 5 of the image 5 and the entity label 7 of the image 7 may be fused, so as to label the image to be recognized.

In this embodiment of the present disclosure, first, one or more CNN features of an image to be recognized is extracted; next, the image to be recognized is input to a predefined set of image classifiers, a probability value for each image classifier in the set of image classifiers is obtained according to the CNN features of the image to be recognized, and at least one image classifier is selected, from the set of image classifiers according to the probability value for each image classifier, as a target image classifier; then, a degree of similarity between each image in the target image classifier and the image to be recognized is determined, and multiple images are selected, from the target image classifier according to the degree of similarity, as target images; and eventually, the image to be recognized is labeled by using a class label corresponding to a class cluster in the target image classifier and entity labels corresponding to the target images in the target image classifier. Precision of image recognition is improved by performing two times of similarity matching and calculation to label an image to be recognized.

Figure 3:
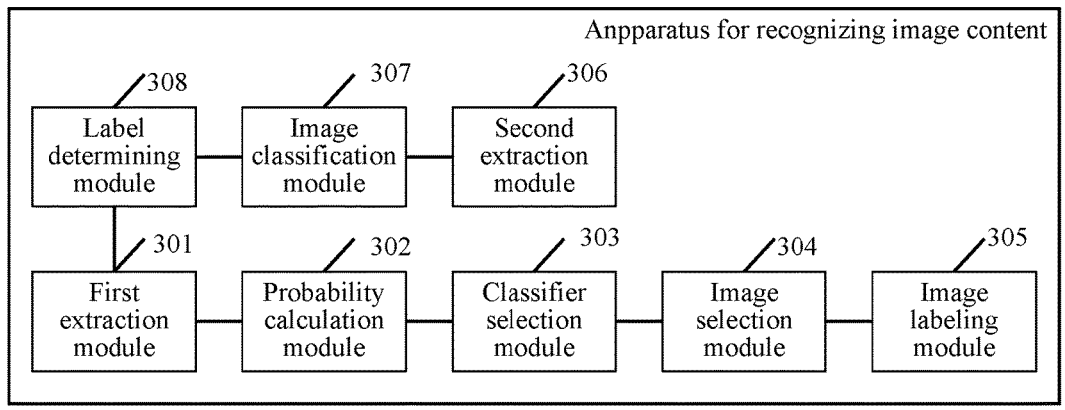
FIG. 3 is a schematic structural diagram of an apparatus for recognizing an image's content according to an embodiment of the present disclosure.

Referring to FIG. 3, FIG. 3 is a schematic structural diagram of an apparatus for recognizing an image's content according to an embodiment of the present disclosure. As shown in FIG. 3, the apparatus in this embodiment of the present disclosure includes a first extraction module 301, a probability calculation module 302, a classifier selection module 303, an image selection module 304, an image labeling module 305, a second extraction module 306, an image classification module 307, and a label determining module 308. Specifically:

The first extraction module 301 is configured to extract one or more CNN features of an image to be recognized.

In specific implementation, a CNN is a neural network parallel processor based on local connectivity of neurons. A basic structure of the CNN includes a feature extraction layer and a feature map layer. In the feature extraction layer, the input of each neuron is connected to local receptive fields of a previous layer. A local feature is extracted. Once the local feature is extracted, a positional relationship between the local feature and another feature is determined. In the feature map layer, each computing layer of the network is composed of multiple feature map. Every feature map is a plane in which weights of all neurons are equal. An activation function which has little impact on a function kernel is used for a structure of the feature map, which makes the feature map have shift invariance. Besides, since the neurons in the mapping plane share weight, the number of free parameters of the network is reduced. Each convolution layer in the CNN is followed by a computing layer which is used to calculate a local average and a second extract. This unique two-feature extraction structure reduces feature resolution.

The probability calculation module 302 is configured to: input the image to be recognized to a predefined set of image classifiers, and obtain, according to the CNN features of the image to be recognized, a probability value for each image classifier in the set of image classifiers, where each image classifier includes a class cluster, the class cluster corresponds to a class label, each class cluster includes multiple images, and each image of the multiple images corresponds to an entity label.

Figure 4:
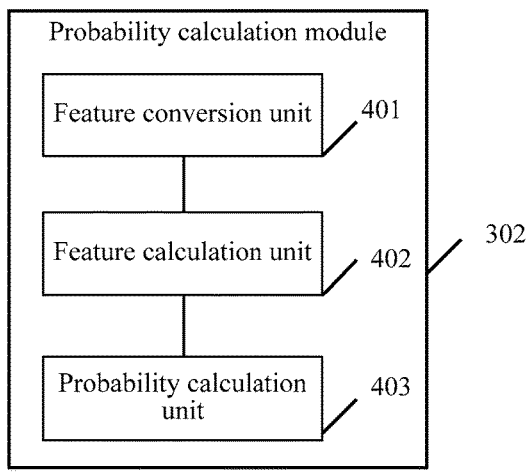
FIG. 4 is a schematic structural diagram of a probability calculation module in an apparatus according to an embodiment of the present disclosure.

In specific implementation, as shown in FIG. 4, the probability calculation module 302 may further include a feature conversion unit 401, a feature calculation unit 402, and a probability calculation unit 403.

The feature conversion unit 401 is configured to convert the CNN features of the image to be recognized into a feature vector of the image to be recognized, where each image classifier corresponds to a feature vector.

The feature calculation unit 402 is configured to calculate a vector inner product of each image classifier and the image to be recognized according to a coefficient vector of each image classifier and the feature vector of the image to be recognized.

The probability calculation unit 403 is configured to calculate, according to the vector inner product of each image classifier and the image to be recognized, the probability value for each image classifier.

Further, the vector inner product of each image classifier and the image to be recognized is mapped to a positive real number field to obtain exponential values, and a sum of the exponential values is calculated; and the exponential values of the target image classifier and the image to be recognized are divided by the sum of the exponential values to calculate a probability value for the target image classifier. It should be noted that after the image to be recognized is input to the set of image classifiers: if an image classifier has a largest probability value, it indicates that the image to be recognized has a highest degree of similarity with and image in the image classifier; and if an image classifier has a smallest probability value, it indicates that the image to be recognized has a lowest degree of similarity with an image in the image classifier is the lowest. Moreover, one class cluster may correspond to one or more class labels, and an image may correspond to one or more entity labels.

For example, assuming that the set of image classifiers includes N image classifiers, each image classifier model is a vector $w_k$, a probability value that a vector x of the image to be recognized belongs to a $k^{th}$ image classifier model is input, and a calculation formula is as follows:

$$P(k) = \frac{\exp(w_k^T x)}{\sum_{i=1}^{N} \exp(w_i^T x)}.$$

The classifier selection module 303 is configured to select, from the set of image classifiers, at least one image classifier as a target image classifier according to the probability value of the image classifier.

In specific implementation, probability values output by image classifiers are compared, the probability values are arranged in descending order, at least one probability value that ranks at the top is selected, and an image classifier corresponding to the at least one probability value is set as a target image classifier.

The image selection module 304 is configured to: determine a degree of similarity between each image in the target image classifier and the image to be recognized, and select, from the target image classifier, multiple images as target images when their respective degrees of similarity with the image to be recognized exceed a predefined threshold.

In specific implementation, first, the CNN features of the image to be recognized is converted into the feature vector of the image to be recognized, one or more CNN features of each image in the target image classifier is obtained, the CNN features of each image in the target image classifier is converted into a feature vector of each image, and the feature vector of each image in the target image classifier is multiplied by the feature vector of the image to be recognized to obtain a vector inner product. When the vector inner product is larger, the degree of similarity is higher. Eventually, degrees of similarity between the image to be recognized and images in the target image classifier are compared and sorted in descending order, multiple degrees of similarity that rank at the top are selected, and images corresponding to the multiple degrees of similarity are used as target images.

The image labeling module 305 is configured to label, the image to be recognized according to a class label corresponding to the target image classifier and entity labels corresponding to the target images in the target image classifier.

For example, the set of image classifiers includes a class cluster 1, a class cluster 2, and a class cluster 3. The class cluster 1, the class cluster 2, and the class cluster 3 correspond to a class label 1, a class label 2, and a class label 3, respectively. The class cluster 1 includes an image 1, an image 2, and an image 3. The class cluster 2 includes an image 4 and an image 5. The class cluster 3 includes an image 6, an image 7, and an image 8. The images 1 to 8 correspond to an entity label 1 to an entity label 8, respectively. The class cluster 2 and the class cluster 3 are selected according to a probability value output by an image classifier. It is determined that the image to be recognized has a highest degree of similarity with the image 5 in the class cluster 2 and the image 7 in the class cluster 3. Therefore, the class label 2 and the class label 3 may be fused, and the entity label 5 of the image 5 and the entity label 7 of the image 7 may be fused, so as to label the image to be recognized.

Optionally, as shown in FIG. 3, the apparatus in this embodiment of the present disclosure further includes:

The second extraction module 306 is configured to: extract one or more CNN features of each image of multiple images, and recognize text information corresponding to each image to obtain an entity label of each image.

In specific implementation, multiple search terms with high search frequency may be first selected to form a download dictionary. A cluster of web crawlers captures a related image and text information corresponding to the image on the Internet by using each search term in the download dictionary, and saves these images and the text information corresponding to the images in a distributed file system. The CNN feature of each image of the multiple images is extracted by using parallel CNN computing, and the text information corresponding to each image is recognized by using an NLP word, so as to obtain the entity label of each image.

The image classification module 307 is configured to classify, according to the CNN features of each image, the multiple images into multiple class clusters.

In specific implementation, K-means clustering may be performed on CNN features of images that are captured by using a same search term, so as to classify the multiple images to obtain the multiple class clusters. K-means clustering is a process of classifying and organizing similar data members in a data set. In the clustering method, K objects are first randomly selected and used as an initial cluster center. Then a distance between each object and each seed cluster center is calculated. Each object is assigned to a cluster center nearest to the object. The cluster centers and the objects assigned to the cluster centers represent a cluster.

The label determining module 308 is configured to determine a class label for each class cluster according to entity labels of images in the class cluster of the multiple class clusters.

In specific implementation, a quantity of same entity labels of the images in each class cluster is first counted. Then a target entity label is selected as the class label of each class cluster according to the quantity of same entity labels of the images in each class cluster. Eventually, each class cluster is numbered, and a parallel machine learning platform is used to train an LR (a classification algorithm) classification model to obtain a set of image classifiers. In addition, same entity labels in each class cluster may be sorted, and an entity label whose quantity ranks top n is set as the class label of the class cluster.

In this embodiment of the present disclosure, first, one or more CNN features of an image to be recognized is extracted; next, the image to be recognized is input to a predefined set of image classifiers, a probability value for each image classifier in the set of image classifiers is obtained according to the CNN features of the image to be recognized, and at least one image classifier is selected, from the set of image classifiers according to the probability value for each image classifier, as a target image classifier; then, a degree of similarity between each image in each class cluster in the target image classifier and the image to be recognized is determined, and an image that has a highest degree of similarity with the image to be recognized is selected, from each class cluster in the target image classifier, as a target image; and eventually, the image to be recognized is labeled by using a class label corresponding to the class cluster in the target image classifier and entity labels corresponding to the target images in each cluster in the target image classifier. Precision of image recognition is improved by performing two times of similarity matching and calculation to label an image to be recognized.

Figure 5:
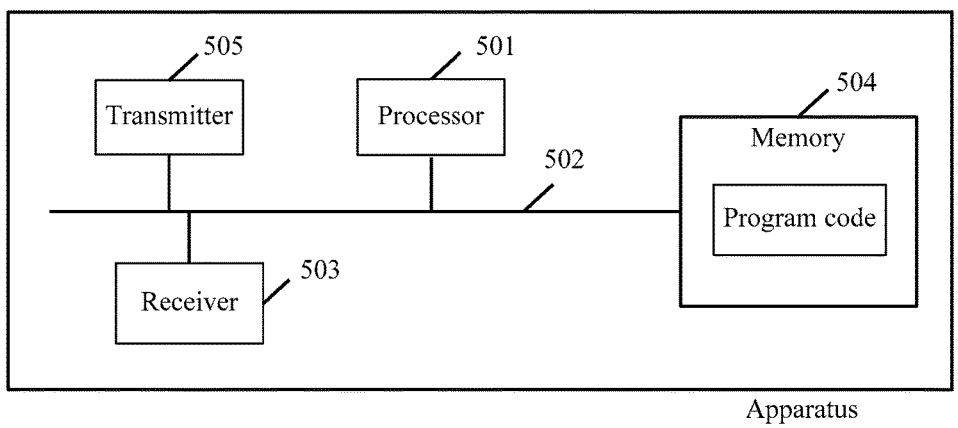
FIG. 5 is a schematic structural diagram of another apparatus for recognizing an image's content according to an embodiment of the present disclosure.

Referring to FIG. 5, FIG. 5 is a schematic structural diagram of another apparatus for recognizing an image's content according to an embodiment of the present disclosure. As an implementation manner, the apparatus for recognizing an image's content according to this embodiment may be a server or another computing device. As shown in FIG. 5, the apparatus may include: at least one processor 501 (for example, a CPU) and at least one memory 504. Optionally, the apparatus may further include at least one communication bus 502, at least one receiver 503, and at least one transmitter 505. The communication bus 502 is configured to implement connection and communication between the components. The receiver 503 and the transmitter 505 of the apparatus in this embodiment of the present disclosure may be wired transmit ports, or may be wireless devices such as antenna devices, and are configured to perform signal or data communication with another node device. The memory 504 may be a high-speed RAM memory, or may be a non-volatile memory such as at least one disk memory. The memory 504 may optionally further be at least one storage apparatus located far away from the processor 501. The memory 504 stores a group of program code, and the processor 501 is configured to invoke the program code stored in the memory 504 to perform the following operations:

extracting one or more CNN features of an image to be recognized;

inputting the image to be recognized to a predefined set of image classifiers, and obtaining, according to the CNN features of the image to be recognized, a probability value for each image classifier in the set of image classifiers, where each image classifier includes a class cluster, the class cluster corresponds to a class label, each class cluster includes multiple images, and each image of the multiple images corresponds to an entity label;

selecting, from the set of image classifiers, at least one image classifier as a target image classifier according to the probability value of the image classifier;

determining a degree of similarity between each image in the target image classifier and the image to be recognized, and selecting, from the target image classifier, multiple images as target images when their respective degrees of similarity with the image to be recognized exceed a predefined threshold; and labeling, the image to be recognized according to a class label corresponding to the target image classifier and entity labels corresponding to the target images in the target image classifier.

The processor 501 may further perform the following operations:

converting the CNN features of the image to be recognized into a feature vector of the image to be recognized;

calculating a vector inner product of each image classifier and the image to be recognized according to a coefficient vector of each image classifier and the feature vector of the image to be recognized; and calculating the probability value for the image classifier according to the vector inner product of the image classifier and the image to be recognized.

The processor 501 may further perform the following operations:

mapping the vector inner product of each image classifier and the image to be recognized to a positive real number field to obtain exponential values, and calculating a sum of the exponential values; and dividing the exponential values of the target image classifier and the image to be recognized by the sum of the exponential values, to calculate a probability value for the target image classifier.

The processor 501 may further perform the following operations:

obtaining one or more CNN features of each image in the target image classifier;

converting the CNN features of each image in the target image classifier into a feature vector of each image; and multiplying the feature vector of each image in the target image classifier by the feature vector of the image to be recognized to obtain the degree of similarity.

The processor 501 may further perform the following operations:

extracting one or more CNN features of each image of multiple images, and recognizing text information corresponding to each image to obtain an entity label of each image;

classifying, according to the CNN features of each image, the multiple images into multiple class clusters; and determining a class label for each class cluster according to entity labels of images in the class cluster of the multiple class clusters.

The processor 501 may further perform the following operations:

counting a quantity of same entity labels of the images in each class cluster; and selecting a target entity label as the class label of each class cluster according to the quantity of same entity labels of the images in each class cluster.

It should be noted that the foregoing method embodiments are illustrated as a series of action combinations for ease of description; however, a person skilled in the art should know that the present disclosure is not limited to the described order of actions, because based on the present disclosure, some operations may be performed in another order or at the same time. Next, a person skilled in the art should know that the embodiments described in the specification are all preferred embodiments, and the involved actions and modules are not necessarily required in the present disclosure.

In the foregoing embodiments, the descriptions of the embodiments place different emphasis on different content, and for a part that is not detailed in an embodiment, reference can be made to the relevant descriptions of other embodiments.

A person of ordinary skill in the art may understand that all or some of the operations of the methods in the foregoing embodiments may be implemented by a program instructing relevant hardware. The program may be stored in a non-transitory computer readable storage medium. When the program is executed, a machine or a device may execute the procedure of the embodiments of the foregoing methods. The storage medium may include a flash drive, a read-only memory (ROM), a random access memory (RAM), a magnetic disk, an optical disc, or the like. In addition, the computer readable storage medium may further be various types of recording media that can be accessed by a computer device by using a network or communication link, for example, a recording medium from which data can be extracted by using a router, the Internet, a local area network, and the like. Further, the computer readable storage medium may refer to multiple computer readable storage media in a same computer system, for example, or may refer to computer readable storage media distributed in multiple computer systems or computing apparatuses.

The method and apparatus for recognizing an image's content provided in the embodiments of the present disclosure are described in detail above. The principle and implementation manner of the present disclosure are described herein by using specific examples. The description about the foregoing embodiments is merely provided for ease of understanding of the method and core ideas of the present disclosure. A person of ordinary skill in the art can make variations and modifications to the present disclosure in terms of the specific implementation manners and application scopes according to the ideas of the present disclosure. Therefore, the content of the specification shall not be construed as a limitation to the present disclosure.

What is claimed is:

1. A method for recognizing an image's content performed at a computing device having one or more processors and memory storing one or more programs to be executed by the one or more processors, the method, comprising:

extracting one or more features from an image to be recognized;

comparing the one or more features of the image with a predefined set of image classifiers and obtaining a probability value for each image classifier in the predefined set of image classifiers by:

converting the one or more features of the image to be recognized into a feature vector of the image to be recognized;

calculating a vector inner product of the image classifier and the image to be recognized according to a coefficient vector of the image classifier and the feature vector of the image to be recognized; and calculating the probability value for the image classifier according to the vector inner product of the image classifier and the image to be recognized;

selecting, from the predefined set of image classifiers, at least one image classifier as a target image classifier according to the probability value of the image classifier;

determining a degree of similarity between each image in the target image classifier and the image to be recognized, and selecting, from the target image classifier, multiple images as target images when their respective degrees of similarity with the image to be recognized exceed a predefined threshold; and labeling, the image to be recognized according to a class label corresponding to the target image classifier and entity labels corresponding to the target images in the target image classifier.

2. The method according to claim 1, wherein the one or more features are extracted from the image to be recognized using convolutional neural network (CNN).

3. The method according to claim 1, wherein each image classifier includes a class label and multiple images, each image having an entity label.

4. The method according to claim 1, wherein the calculating the probability value for the image classifier according to the vector inner product of the image classifier and the image to be recognized comprises:

mapping the vector inner product of the image classifier and the image to be recognized to a positive real number field to obtain exponential values, and calculating a sum of the exponential values; and dividing the exponential values of the target image classifier and the image to be recognized by the sum of the exponential values, to calculate a probability value for the target image classifier.

5. The method according to claim 1, wherein the determining a degree of similarity between each image in the target image classifier and the image to be recognized comprises:

obtaining one or more features for each image in the target image classifier;

converting the one or more features of the image in the target image classifier into a feature vector of the image; and multiplying the feature vector of the image in the target image classifier by the feature vector of the image to be recognized to obtain the degree of similarity.

6. The method according to claim 1, further comprising:

before extracting one or more features from an image to be recognized:

extracting one or more features for each image of multiple images, and recognizing text information corresponding to the image to obtain an entity label of the image;

classifying, according to the one or more features of each image, the multiple images into multiple class clusters; and determining a class label for each class cluster according to entity labels of images in the class cluster of the multiple class clusters.

7. The method according to claim 6, wherein the determining a class label for each class cluster according to entity labels of images in the class cluster of the multiple class clusters comprises:

counting a quantity of same entity labels of the images in the class cluster; and selecting a target entity label as the class label of the class cluster according to the quantity of same entity labels of the images in the class cluster.

8. A computing device for recognizing an image's content, comprising:

one or more processors;

memory; and one or more programs stored in the memory, the one or more programs being configured to be executed by the one or more processors and cause the computing device to perform a plurality of operations including:

extracting one or more features from an image to be recognized;

comparing the one or more features of the image with a predefined set of image classifiers and obtaining a probability value for each image classifier in the predefined set of image classifiers by:

converting the one or more features of the image to be recognized into a feature vector of the image to be recognized;

calculating a vector inner product of the image classifier and the image to be recognized according to an coefficient vector of the image classifier and the feature vector of the image to be recognized; and calculating the probability value for the image classifier according to the vector inner product of the image classifier and the image to be recognized;

selecting, from the predefined set of image classifiers, at least one image classifier as a target image classifier according to the probability value of the image classifier;

determining a degree of similarity between each image in the target image classifier and the image to be recognized, and selecting, from the target image classifier, multiple images as target images when their respective degrees of similarity with the image to be recognized exceed a predefined threshold; and labeling, the image to be recognized according to a class label corresponding to the target image classifier and entity labels corresponding to the target images in the target image classifier.

9. The computing device according to claim 8, wherein the one or more features are extracted from the image to be recognized using convolutional neural network (CNN).

10. The computing device according to claim 8, wherein each image classifier includes a class label and multiple images, each image having an entity label.

11. The computing device according to claim 8, wherein the calculating the probability value for the image classifier according to the vector inner product of the image classifier and the image to be recognized comprises:

mapping the vector inner product of the image classifier and the image to be recognized to a positive real number field to obtain exponential values, and calculating a sum of the exponential values; and dividing the exponential values of the target image classifier and the image to be recognized by the sum of the exponential values, to calculate a probability value for the target image classifier.

12. The computing device according to claim 8, wherein the determining a degree of similarity between each image in the target image classifier and the image to be recognized comprises:

obtaining one or more features for each image in the target image classifier;

converting the one or more features of the image in the target image classifier into a feature vector of the image; and multiplying the feature vector of the image in the target image classifier by the feature vector of the image to be recognized to obtain the degree of similarity.

13. The computing device according to claim 8, wherein the plurality of operations further include:

before extracting one or more features from an image to be recognized:

extracting one or more features for each image of multiple images, and recognizing text information corresponding to the image to obtain an entity label of the image;

classifying, according to the one or more features of each image, the multiple images into multiple class clusters; and determining a class label for each class cluster according to entity labels of images in the class cluster of the multiple class clusters.

14. The computing device according to claim 13, wherein the determining a class label for each class cluster according to entity labels of images in the class cluster of the multiple class clusters comprises:

counting a quantity of same entity labels of the images in the class cluster; and selecting a target entity label as the class label of the class cluster according to the quantity of same entity labels of the images in the class cluster.

15. A non-transitory computer readable storage medium, storing one or more programs that, when executed by one or more processors of a computing device, cause the computing device to perform a plurality of operations including:

extracting one or more features from an image to be recognized;

comparing the one or more features of the image with a predefined set of image classifiers and obtaining a probability value for each image classifier in the predefined set of image classifiers by:

converting the one or more features of the image to be recognized into a feature vector of the image to be recognized;

calculating a vector inner product of the image classifier and the image to be recognized according to a coefficient vector of the image classifier and the feature vector of the image to be recognized; and calculating the probability value for the image classifier according to the vector inner product of the image classifier and the image to be recognized;

selecting, from the predefined set of image classifiers, at least one image classifier as a target image classifier according to the probability value of the image classifier;

determining a degree of similarity between each image in the target image classifier and the image to be recognized, and selecting, from the target image classifier, multiple images as target images when their respective degrees of similarity with the image to be recognized exceed a predefined threshold; and labeling, the image to be recognized according to a class label corresponding to the target image classifier and entity labels corresponding to the target images in the target image classifier.

16. The non-transitory computer readable storage medium according to claim 15, wherein the one or more features are extracted from the image to be recognized using convolutional neural network (CNN).

17. The non-transitory computer readable storage medium according to claim 15, wherein each image classifier includes a class label and multiple images, each image having an entity label.

18. The non-transitory computer readable storage medium according to claim 15, wherein the calculating the probability value for the image classifier according to the vector inner product of the image classifier and the image to be recognized comprises:

mapping the vector inner product of the image classifier and the image to be recognized to a positive real number field to obtain exponential values, and calculating a sum of the exponential values; and dividing the exponential values of the target image classifier and the image to be recognized by the sum of the exponential values, to calculate a probability value for the target image classifier.

19. The non-transitory computer readable storage medium according to claim 15, wherein the determining a degree of similarity between each image in the target image classifier and the image to be recognized comprises:

obtaining one or more features for each image in the target image classifier;

converting the one or more features of the image in the target image classifier into a feature vector of the image; and multiplying the feature vector of the image in the target image classifier by the feature vector of the image to be recognized to obtain the degree of similarity.

* * * * *